United States Patent [19]

Eisenmann et al.

[11] 3,946,127

[45] Mar. 23, 1976

[54] LAMINATED STRUCTURAL ARTICLE WITH CONSTITUENT ELEMENTS HAVING INHERENT FRACTURE ARRESTMENT CAPABILITY

[75] Inventors: James R. Eisenmann; Ben E. Kaminski; Max E. Waddoups, Jr., all of Fort Worth, Tex.

[73] Assignee: General Dynamics Corporation, Fort Worth, Tex.

[22] Filed: Dec. 4, 1972

[21] Appl. No.: 312,043

[52] U.S. Cl. ............... 428/48; 244/133; 428/54; 428/55; 428/109; 428/114; 428/189; 428/212; 428/902
[51] Int. Cl.² .................................. B32B 3/10
[58] Field of Search ......... 161/55, 57, 60, 143, 145, 161/160, 166, 167, 149, 36, 37, 46, 95, 96; 244/133; 428/48, 54, 109, 114, 189, 212, 902

[56] References Cited

UNITED STATES PATENTS

| | | | |
|---|---|---|---|
| 3,391,050 | 7/1968 | Nebesar | 161/143 |
| 3,462,289 | 8/1969 | Rohl et al. | 117/46 |
| 3,649,435 | 3/1972 | Varlas | 161/156 |
| 3,756,905 | 9/1973 | Mills et al. | 161/143 |
| 3,767,499 | 10/1973 | Koss | 161/57 |

*Primary Examiner*—George F. Lesmes
*Assistant Examiner*—William R. Dixon, Jr.
*Attorney, Agent, or Firm*—Charles E. Schurman; Charles C. M. Woodward

[57] ABSTRACT

A functionally improved tape-like, heterogeneous, strip material for use in the fabrication of laminated structural shapes having high value of Young's Modulus and high tensile strength, comprising collocated, unidirectional, tectonic filaments such as graphite, boron, silicon-carbide, S-glass and E-glass, embodied in planar concourse, into an organic, thermosetting resin matrix or sheath such as an epoxy or polyimide base polymer forming a basal tract having at least one integral marginal tract of differing physical character so that a relatively lower Young's Modulus is exhibited by the material comprising the marginal tract than that exhibited by the basal tract. This difference in structural characteristic serves to provide an inherent arrestment barrier against fast rupture propagation of fractures which may develop in the basal tract material when the composite strip is subjected to sustained overload or external damage. Structural composite shapes fabricated from precisely oriented strips, in ply-by-ply lamination, acquire this same fracture propagation arresting capability when all strips are oriented in such manner, during the laminating process or ply-by-ply build-up into a multiple layer composite of known toughness and stiffness, that the basal tracts or prime portions and the marginal tracts or edge portions of all strips disposed in a given direction in one ply of the laminate are in a vertically aligned pattern with the strips in all other plies or the laminate which extend in the same direction.

24 Claims, 8 Drawing Figures

LAMINATED STRUCTURAL ARTICLE WITH CONSTITUENT ELEMENTS HAVING INHERENT FRACTURE ARRESTMENT CAPABILITY

BACKGROUND OF THE INVENTION

1. Field of the Invention

The present invention relates generally to means for inherently improving the structural integrity of filamentary tectonic tape-like strips or sheet materials and of shaped structural components which are fabricated therefrom by a precisely controlled lamination thereof.

More particularly the invention relates to the composition and fabrication of tectonic tapes, strips and sheet material employed in the lamination of structural shapes, hereinafter referred to as filamentary composite strips and structural shapes as defined by J. E. Ashton, J. C. Haplin and P. H. Petit in their publication: PRIMER ON COMPOSITE MATERIALS, chapter 1, pages 1 and 2, Technomic Publishing Company, Inc., Stamford, Conn. 1969, which are characterized by an inherent capability for providing protection against cataclysmic disintegration of the structure thus fabricated by the arrestment of any fast propagating fracture that may develop resultant from extrinsically imparted damage or sustained overloading of the tape or fabricated shaped article.

2. Description of the Prior Art

Conventional filamentary composite tapes, strips and fabricated tectonic shapes have little or no tendency toward nucleation and growth of through cracks under cyclic loading. However, the brittle static mode of failure exhibited by such filamentary composite strips and shapes creates problem in the structural integrity of these materials, and particularly in the cataclysmic disintegration or complete structural failure thereof in the event damage is inadvertently incurred or sustained overloading is experienced. It is well recognized, particularly in the aerospace industry, that this problem of static mode failure in advanced filamentary composite materials exists. Prior to the present invention, however, no known means had been devised to employ elastic fracture mechanics for predicting behavior of such materials under sustained loading in uniaxial tension. Such loading results in fast propagation of a rupture, as may be caused by external damage. Neither has a dual modulus, heterogeneous, tape-like strip material having residual strength capacity in excess of limit design load, even when damaged, been evolved or proposed by those having skill in the art.

SUMMARY OF THE INVENTION

The general object of the present invention is to provide greatly improved laminated structural shapes or articles together with their constituent tape-like heterogeneous strip components, fabricated so that structural integrity is greatly enhanced by an inherent capability for retarding, arresting and substantially containing propagating fractures resultant from extrinsic damage or sustained overloading thereof.

A more specific object of the invention is the fabrication of tectonic filamentary composite articles and shapes, usually of tape-like strips, which comprise alternately interposed barrier strips having a relatively low value of Young's Modulus and made of either filamented, woven or matted strip material, between basal load-carrying strip material of higher Young's Modulus as an integral part of the structural pattern; the barrier strips being oriented and aligned so that they significantly reduce the stress intensity at the tip of a fast propagating fracture and possess sufficient fracture toughness that an incursive propagating fracture is rendered non-critical and the resultant laminate retains a residual strength of adequate magnitude. (Fracture toughness as used herein is a phrase of the art defined in ASTM-Test Method E399-72, Part 31 (1972). Such shape may be made for example by laminating boron-epoxy or grahite-epoxy prime, high modulus strips. Individual low modulus barrier strips may be disposed intermediately and in juxtaposition with strips of such high modulus material. However, heterogeneous strips or tapes comprised of a basal high modulus tract, if desired, and two marginal tracts of low modulus material embodied within a common matrix may be employed instead of two separate strips, one of high modulus and the other of lower modulus. In use, such heterogeneous strips for making a laminate are simply disposed adjacent or in juxtaposition one to the other and the resulting pattern inherently provides the requisite high modulus/low modulus relationship with the capability for arresting a propagating fracture in the material of the high modulus or prime load carrying tract.

The invention will be better understood and its other objects and advantages will become more readily apparent from the following detailed description of the appended drawings, wherein:

DESCRIPTION OF THE PREFERRED EMBODIMENTS

Figure 1:
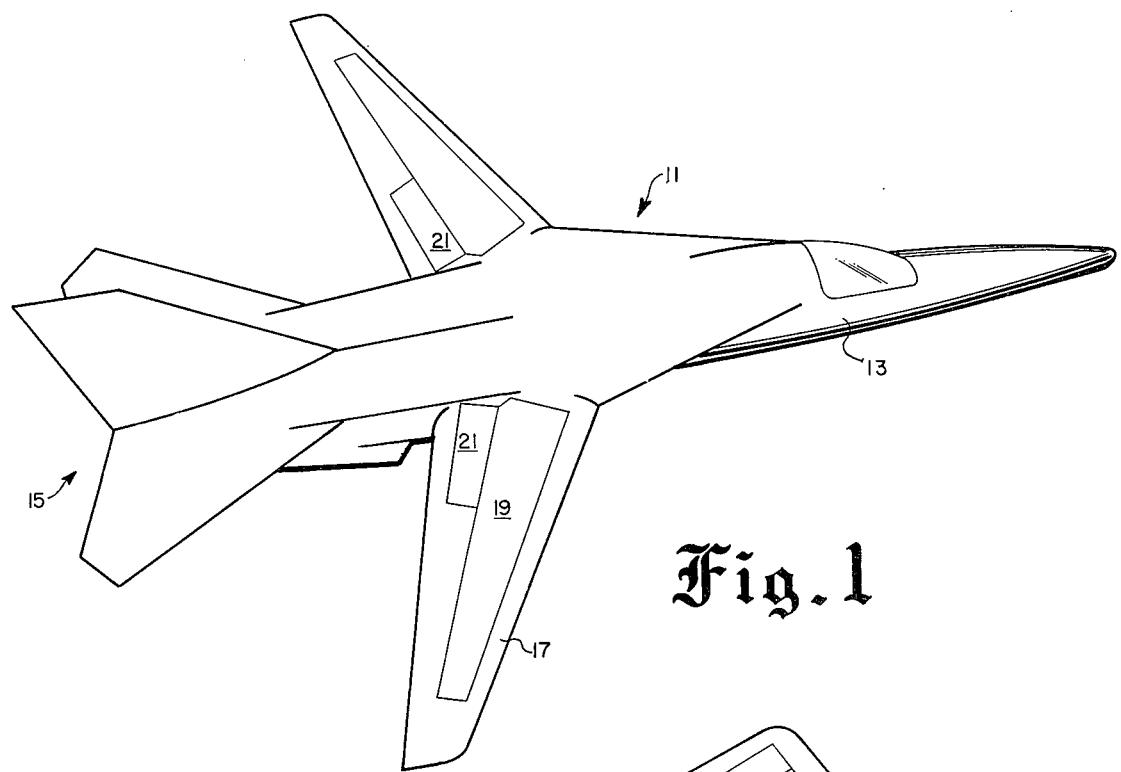
FIG. 1 is a pictorial representation of a typical high performance aircraft whose structure is largely comprised of laminated tectonic filamentary composite shapes.
Figure 2:
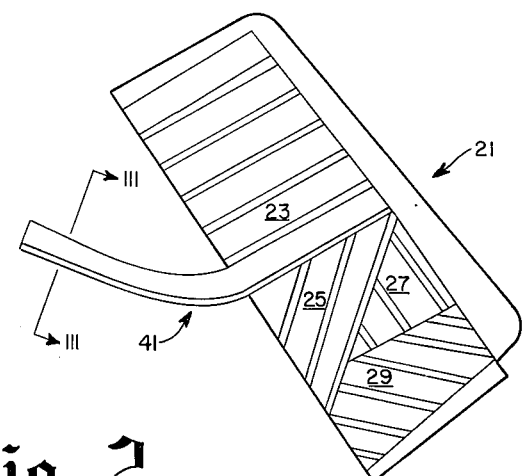
FIG. 2 is a pictorial example of one of the component shapes of FIG. 1 being shown detached, enlarged and exemplified in the form of ply-by-ply lamination as effected by disposition of tape or strip elements of the present invention in an angular pattern.

Referring now to FIG. 1 of the drawings there is illustrated a high performance, highly stressed aircraft 11 having fuselage 13, aerodynamic control components 15, and wings 17, the wing being shown as including structural panel members 19 and 21, typical of those supersonic aircraft that would have a significant proportion of shaped structural components such as panels 19 and 21, fabricated from the tectonic filamentary composite materials of the present invention. For clarity, wing panel 21, in FIG. 2, is shown disengaged, enlarged and sectionalized by ply cut-away. It is obvious, of course, that a panel made in accordance with the present invention is applicable to any of the aircraft components 13, 15 or 17. The laminated plies illustrated by the cut-away of FIG. 2 are merely indicative of typical orientation; actual orientation and relative strip and ply disposition and orientation being dictated and governed by computation and preanalysis of stress and strain and by design constraints. Relative to panel 21, ply 23 is shown to be oriented at 0°, ply 25 has a +45° orientation, ply 27 has a 90° orientation and ply 29 has a −45° orientation for purposes of the present disclosure, the plies shown here in their preferred embodiment as strips 41 comprising bi-modulus tracts.

Figure 3:
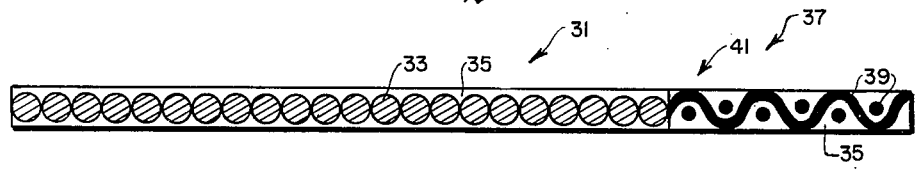
FIG. 3 is an enlarged sectional view taken at line III—III in FIG. 2.

An enlarged cross-section of this preferred embodiment of the invented tape-like heterogeneous bi-modulus strip 41, as taken at III—III in FIG. 2 is shown in FIG. 3. Tract 31 comprises filaments 33 having a high value of Young's Modulus or Modulus of elasticity (E), such as boron, graphite or silicon-carbide, S-glass and the like, which are collocated in substantial planar concourse, tensioned and then embodied into and impregnated with a fracture tough, resinous, thermosetting matrix or sheath 35 such as an epoxy base polymer or polyimide. Thus, tract 31 of strip 41, per se, forms a prime, load carrying, high modulus tract or strip. When high modulus filamentary strips 31 made in this manner are aligned and combined with a narrower strip or tract 37 having relatively lower modulus fibers or filaments 39, such as linear filaments or woven S-glass, as shown in FIGS. 2 and 3, and the resultant assembly is impregnated, the resinous, heterogeneous strip 41 is formed and characterized by a basal or primary tract 31 and at least one integral, marginal barrier tract 37.

Figure 6:
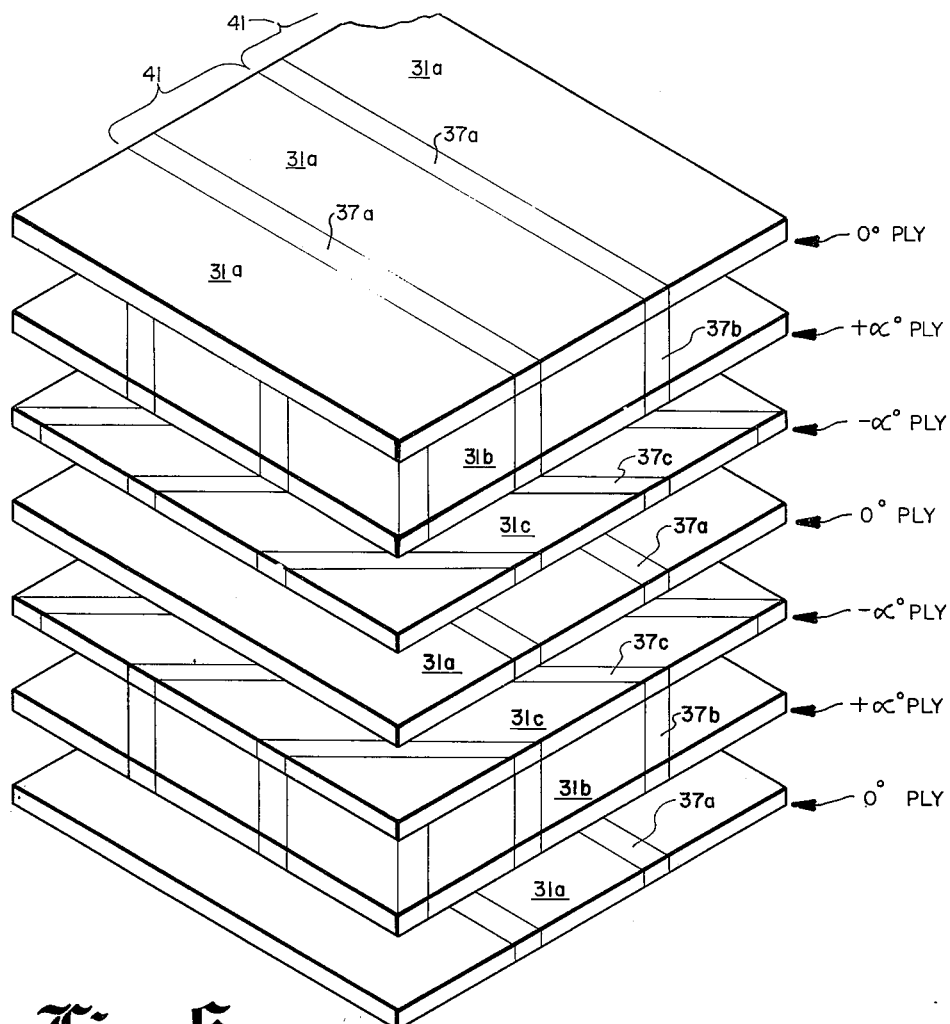
FIG. 6 is an exploded schematic illustration of a typical ply-by-ply application and angular orientation of the tape-like, heterogeneous strip composite as employed in the fabrication of laminated shapes having the greatly enhanced structural integrity in accordance with the present invention.

In the fabrication of laminated tectonic shaped articles, these strips 41 are disposed in a predetermined direction and strip length and in juxtaposition to form an oriented lamina or ply. As best illustrated in FIG. 6 the marginal barrier tracts 37 are thereby intrinsically disposed at the proper intervals to form rupture arrestment barriers against propagating fractures in the prime or basal tract 31. It is necessary, however, when laminating articles in accordance with the present invention, that the fracture barrier strips or tracts 37 running in any given direction in one ply, here designated by a 37a–37c, be vertically aligned with the barrier tracts or strips in all other, plies containing strips 37a–c respectively which are co-extensive therewith and which run in the same direction. The basal tract 31a and its barrier tract 37a are, for example, thus disposed directly over and in the same direction as basal tract 31a and barrier tract 37a in all 0° plies. This relationship holds true for all 0° plies, all +α degree plies, all −α degree plies and ± angles intermediate thereto.

The structural concept and design technique of this invention resulted from an analytical study to ascertain whether conventional fracture mechanics could be appied to filamentary composite strip and laminated materials, particularly to boron/epoxy and graphite/epoxy, where boron or graphite filaments were embodied in an epoxy resin matrix or carrier to form tape or strip composites. The resultant invention established that, by effecting certain technique modifications, linear elastic fracture mechanics could be employed advantageously to predict the behavior of such materials. This modified technique is herein called Macroscopic Fracture Mechanics for Filamentary Composite Material, in order to differentiate it from conventional fracture mechanics.

In order to better understand the invention, attention is directed in the specification following to the macroscopic fracture control design technique and analytical model employed by the inventors in a given situation where local tailoring of stiffness and fracture toughness of laminated composite materials are factors.

The critical applied stress at which a fast crack propagates from an existing through-slit of length 2 $l$ in an infinite plate is given by:

$$\sigma_c = \frac{K_Q}{\sqrt{\pi(l+a)}} \quad (1)$$

where $K_Q$ is the candidate fracture toughness of the material, and $a$ is the characteristic dimension of the intense energy region assumed to exist at the ends of the slit. The two parameters which characterize the fracture behavior of the material, $K_Q$ and $a$, are determined from tests of control specimens and center-notched specimens such as are shown below:

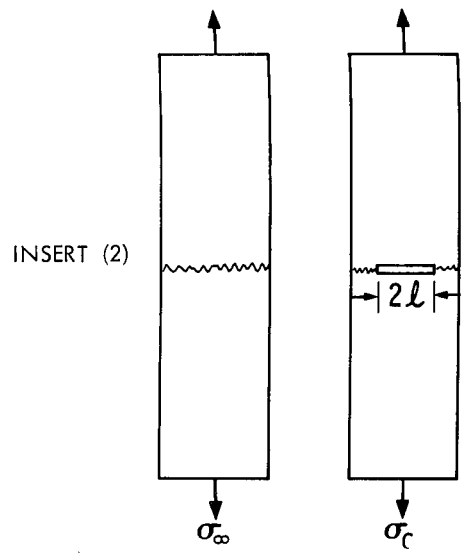

FRACTURE PARAMETERS

Yield the value for $\sigma_\infty/\sigma_c$ from which the fracture parameters are determined from the two equations:

$$a = \frac{l}{\left(\frac{\sigma_\infty}{\sigma_c}\right)^2 - 1}$$

&

$$K_Q = \sigma_\infty \sqrt{\pi a}$$

Figure 8:
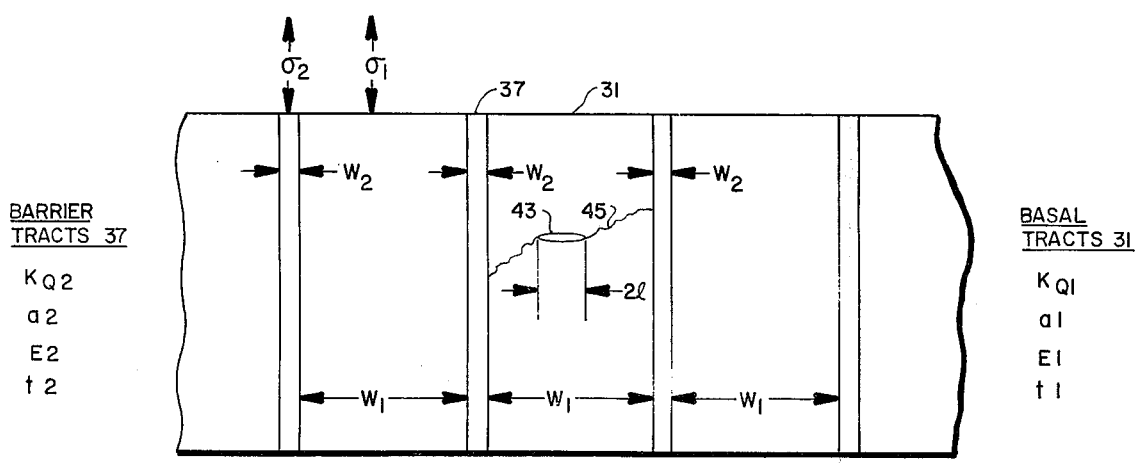
FIG. 8 is a plan view schematic of a test specimen configuration which is typical for those used in the fracture arrestment and control tests hereinafter described.

As indicated in FIG. 8 symbols herein for parameters or values of the basal tracts are denominated by a sub-numeral 1 and for the barrier tracts by a sub-numeral 2.

Figure 4:
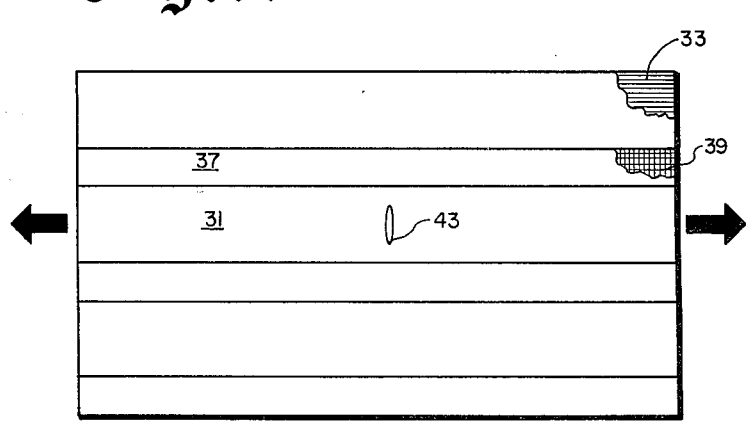
FIG. 4 is a graphic representation of a typical tension specimen of the tape-like heterogeneous strip material of the present invention and particularly shows a test controlled, crack-like flaw ingrafted into its prime tract.
Figure 5:
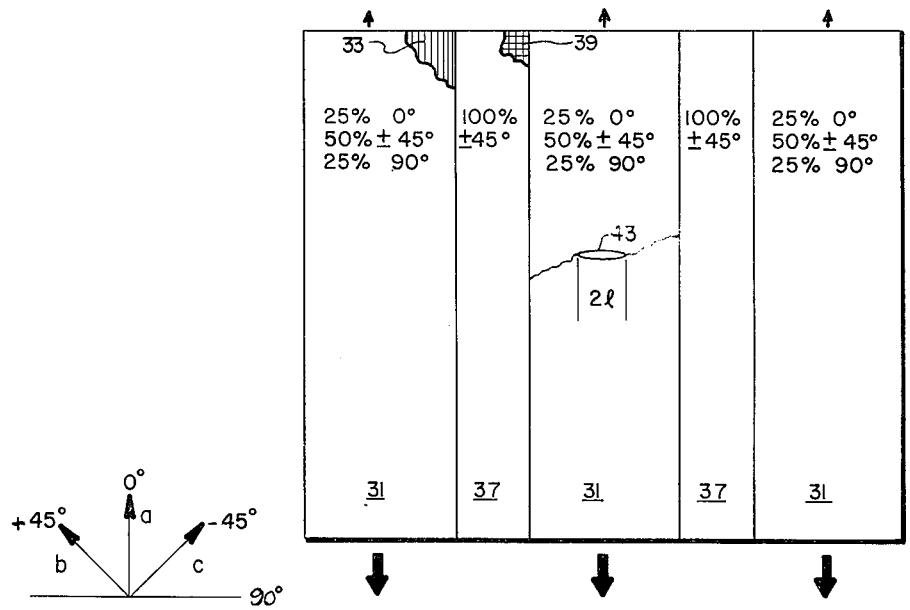
FIG. 5 is similar to FIG. 4 with the exception that the crack-like flaw is shown after propagation and arrestment at barrier tracts.

The ability to predict the fracture behavior of advanced composite laminates coupled with the freedom to locally tailor stiffness in these laminates engendered the concept for a crack-arresting laminate. The arrestment model is shown in FIG. 8 and specimen strips in FIGS. 4, 5 and 7. Here strips of high modulus, load-carrying material 31 of width $w_1$ are separated by low modulus barrier strips 37 of width $w_2$. The function of the barrier strips 37 is to provide a region of low stress with sufficient fracture toughness to render an entering crack 45 of length $w_1$ noncritical.

The slit 43 having an initial length $2l$ in the load-carrying material 31 will propagate as a fast crack 45 when the following condition is met:

$$\sigma_1 \geq \sigma_{c_1} = \frac{K_{Q_1}}{\sqrt{\pi(l+a_1)}}. \tag{2}$$

where $K_{Q_1}$ and $a_1$ are the fracture parameters for the high modulus material. As the propagating crack 45 enters the low modulus barrier strips 37 it has a total length equal to $w_1$ and will diminish and expire if:

$$\sigma_2 < \sigma_{c_2} = \frac{K_{Q_2}}{\sqrt{\pi \left(\frac{w_1}{2}+a_2\right)}}. \tag{3}$$

where $K_{Q_2}$ and $a_2$ are the fracture parameters for the low modulus barrier material 37. For an infinitely wide laminate of the type shown in FIG. 8:

$$\sigma_2 = \frac{E_2}{E_1} \sigma_1. \tag{4}$$

substituting this value of $\sigma_2$ into equation (3) gives:

$$\sigma_1 < \frac{E_1}{E_2} \cdot \frac{K_{Q_2}}{\pi \sqrt{\left(\frac{w_1}{2}+a_2\right)}}. \tag{5}$$

Combining equations (2) and (5) gives the relation:

$$\left(\frac{E_2}{K_Q}\right)^2 \left(\frac{K_{Q_1}}{E_1}\right)^2 \leq \frac{l+a_1}{\frac{w_1}{2}+a_2}. \tag{6}$$

Satisfying this condition insures that any slit 43 of initial length $2l$ will arrest under constant load upon entering the low modulus barrier strips 37. It should be pointed out that the above approach is based upon static considerations only. The barrier strip width, $w_2$, must be adequate to permit the advancing fracture 45 to decelerate to a stop before reaching the far side of the barrier strip.

A fail-safe laminate can be obtained by imposing the condition:

$$\sigma_{c_2} = \frac{K_{Q_2}}{\sqrt{\pi \left(\frac{w_1}{2}+a_2\right)}} \geq \frac{E_2}{E_1} \sigma_{1\cdot \text{Limit}} \tag{7}$$

This condition insures that the laminate containing an arrested crack of length $w_1$ will still sustain limit load. The resulting laminate has the capacity to arrest any crack which propagates at load levels below limit, and thereafter maintain the residual strength capacity at the limit value.

Figure 7:
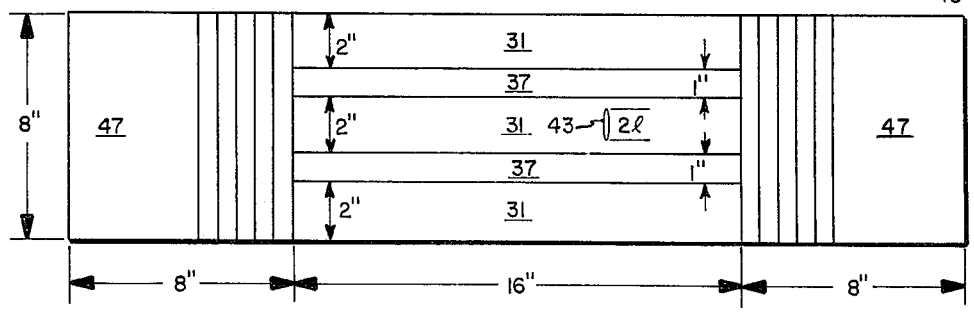
FIG. 7 is a plan view, schematic illustration of the juxtapositioned prime load strips and fracture propagation barrier strips employed as typical models for the conducting of fracture arrestment and control tests, the results of which are hereinafter described.

The analytical values and unique design concept of macroscopic fracture mechanics presented above has been verified and validated by experimental assay and by critique of the results of a series of tests, examples of which follow:

Referring first to FIG. 7, five tensile specimens were constructed as shown. A[0/±45/90 ]$_{2S}$ boron-epoxy laminate was employed. Each specimen was fabricated in one piece; the ±45° or secondary plies being continuous across the specimen thus acting to transmit or distribute loadings on the laminate across an adjacent or primary ply or plies. Each 0° and 90° ply, which would normally occupy the area reserved for the barrier strips, was omitted and replaced by either a +45° or a −45° ply maintaining symmetry about the laminate mid-plane. One of the specimens served as the control, while a different type of flaw was chased into the center of each of the four remaining specimens (three 0.012 inch wide slits of different lengths and one 0.750 inch diameter hole). The control specimen was then loaded in a TINIUS-OLSEN constant load, hydraulic, tension test instrument and strain gaged to measure the strain distribution across the specimen width. A summary of strain readings is presented below:

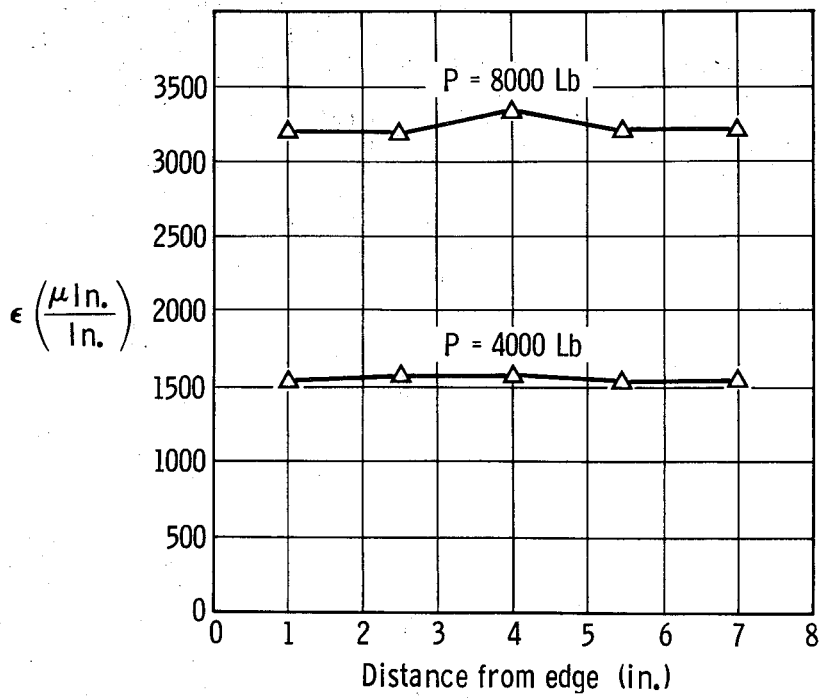

ARREST SPECIMEN STRAIN SURVEY

This confirmed that uniform strain distribution was obtained. The remaining four specimens were loaded in the same manner as the control but were not instrumented. Each specimen was loaded in tension until a fast crack propagated from the initial fracture. If arrestment was achieved, the specimen was unloaded to allow visual inspection of the arrested crack. These specimens were then reloaded to failure to measure residual strength with a 2.0 inch crack present.

Following the notation in FIG. 8, the stress in the primary laminate is given by:

$$\sigma_1 = P_{APPLIED} \frac{E_1}{3E_1 w_1 t_1 + 2E_2 w_2 t_2} \quad (8)$$

and the stress in the barrier strips by:

$$\sigma_2 = \frac{E_2}{E_1} \sigma_1. \quad (9)$$

All specimens were constructed with primary and barrier strips having the following properties:

$E_1 = 11.39 \times 10^6$ psi,
$E_2 = 2.42 \times 10^6$ psi,
$W_2 = 2.0$ inches,
$W_2 = 1.0$ inches,
$t_1 = t_2 = 0.085$ inch. (thickness)

The ultimate strength of the primary strip, $\sigma_{\infty_1}$ has been determined as 60,000 psi. Assuming larger stress-strain behavior, the primary laminate stress at failure for the control specimen obtained by substituting the actual failure load of 35,000 pounds into equation (8) is 64,100 psi. The close agreement between these two values indicates that the specimen was free of significant stress concentration effects. Failure originated approximately 1.0 inch below the fiberglass end grip 47, FIG. 7.

Data obtained from the control and the specimen containing the 0.650 inch long slit was then employed to determine the fracture parameters for the primary laminate in accordance with the parameters for fracture behavior outlined above on page 10 et seq and applying macroscopic fracture mechanics procedures. The initial propagation stress for the 0.450 inch and 0.140 inch slits could then be predicted from equation (2). The specimen containing the 0.650 slit was statically loaded to 15,900 pounds at which time a crack propagated and arrested upon entering the barrier strips. The critical stress in the primary laminate, $\sigma_{c_1}$, at the time of crack propagation was, from equation (8), 29,200 psi.

Following the procedures of macroscopic fracture mechanics for advance composite materials and as shown on page 10 et seq, the fracture parameters from the primary laminate can be evaluated:

$$a_1 = \frac{l}{\left(\frac{\sigma_{\infty_1}}{\sigma_{c_1}}\right)^2 - 1} = \frac{.325}{\left(\frac{64100}{29200}\right)^2 - 1} = .085 \text{ inch,}$$

and $$K_{Q_1} = \sigma_{\infty_1} \sqrt{\pi a_1} = 64100 \sqrt{\pi(.085)} = 32600 \text{ psi } \sqrt{\text{inch}}$$

The critical propagation stress for any other slit of length $2l$ in the same specimen can now be given by equation (2) with the above values of $K_{Q_1}$ and $a_1$:

$$\sigma_{c_1} = \frac{32600}{\sqrt{\pi(l + .085)}} \quad (10)$$

The predicted critical stresses for the 0.450 inch and 0.140 inch slits are, from equation (10), 33,000 psi and 46,600 psi, respectively. These compare very well with the experimental values of 30,700 psi and 48,700 psi.

Cracks propagating from the 0.650 inch slit, 0.450 inch slit, and 0.750 inch diameter hole arrested upon entering the barrier strips. The specimen containing the 0.140 inch slit failed catastrophically. The residual strength data for the specimens containing an arrested 2.0 inch long crack were then evaluated as follows:

Assuming the stress in the barrier strip 37 with the center strip 31 of basal material which failed is given by:

$$\sigma_2 = P_{APPLIED} \frac{E_2}{2E_1 w_1 t_1 + 2E_2 w_2 t_2}. \quad (11)$$

The specimen containing an initial slit of length 0.650 inch had a residual strength after arrestment of 19,000 pounds, and from equation (11), $\sigma_{c_2}$ equals 10,750 psi. The corresponding stress in the remaining primary strip can be obtained from equation (4) as 50,600 psi. Residual strengths for the specimens containing the 0.450 inch slit and 0.750 inch diameter hole were 19,350 pounds and 20,700 pounds, respectively. These correspond to barrier strip stresses of 10,950 psi and 11,700 psi which are consistent with the value of 10,750 psi obtained from the first specimen. Primary laminate stresses at failure for the specimens containing the 0.450 inch slit and 0.750 inch diameter hole were 51,500 psi and 55,000 psi respectively. All three residual strength tests produce primary strip stresses in excess of 40,000 psi, the limit design stress for the primary strip, indicating that this arrestment strip configuration satisfies the accepted definition of fail-safety.

Residual strength data for the specimen containing the 0.650 inch slit can be used to determine the fracture parameters for the barrier strip laminate and to verify that the catastrophic failure of the specimen containing the 0.140 inch slit was predictable. The accepted value for the ultimate strength of the barrier laminate, $\sigma_{\infty_2}$, is 20,000 psi. This value and the previously calculated value of $c_2$, 10,750 psi, yield:

$$a_2 = \frac{l}{\left(\frac{\sigma_{\infty_2}}{\sigma_{c_2}}\right)^2 - 1} = \frac{1.0}{\left(\frac{20000}{10750}\right)^2 - 1} = .406 \text{ inch,}$$

and $$K_Q = \sigma_{\infty_2} \sqrt{\pi a_2} = 20000 \sqrt{\pi(.406)} = 22600 \text{ psi } \sqrt{\text{inch}}.$$

Calculated stress in the barrier strip as the propagating crack entered was 15,000 psi. This value is 40 percent greater than permitted by the inequality expressed in equation (3) using the above values of the fracture parameters for the barrier strip laminate, thus rendering the catastrophic failure predictable.

Data obtained from the five arrestment specimens described above is summarized in Table below:

CRACK-ARREST DATA SUMMARY

| Flaw | Initial Propagation | | | | Residual Strength | | | |
|---|---|---|---|---|---|---|---|---|
| | P (lb) | $N_x$ (lb/in.) | $\sigma_1$ (psi) | $\sigma_2$ (psi) | P (lb) | $N_x$ (lb/in.) | $\sigma_1$ (psi) | $\sigma_2$ (psi) |
| Control | 35000 | 4370 | 64100 | 13600 | — | — | — | — |
| .140 Slit | 26600 | 3320 | 48700 | 10350 | — | — | — | — |
| .450 Slit | 16750 | 2090 | 30700 | 6520 | 19350 | 2420 | 51500 | 10950 |
| .650 Slit | 15900 | 1990 | 29200 | 6200 | 19000 | 2380 | 50600 | 10750 |
| .750 Hole | 17000 | 2120 | 31200 | 6650 | 20700 | 2580 | 55000 | 11700 | and plotted, along with the analytical prediction of specimen behavior:

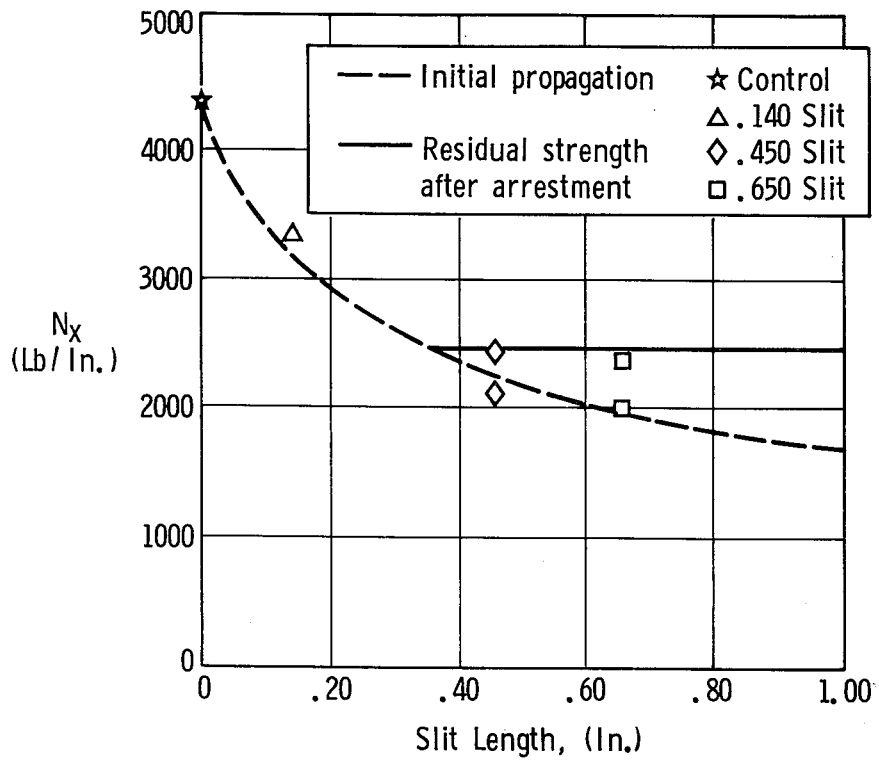

The dashed line represents the predicted load at which initial crack propagation occurs as expressed in equation (10). This curve is based upon test results obtained from the control specimen and the specimen containing the 0.650 inch initial slit. Test data for the 0.40 inch slit and 0.450 inch slit show agreement with this prediction. The solid line represents the average residual strength after arrestment. The three results obtained were within five percent of this mean value.

ADDITIONAL EMBODIMENTS OF THE INVENTION

It should be noted that while a bi-moduli, i.e., high modulus-low modulus, heterogeneus, tape-like strip 41 has been shown and described as the preferred form of laminating strip employed in carrying out the invention, the various plies of the invented laminated structural article having fracture arresting capability may also be fabricated by the alternate disposition of separate high modulus strips and low modulus strips placed in juxtaposition and agglutinated or otherwise made integral and embodied within a common, unitary, resinous matrix. It will also be obvious to those skilled in the art that the heretofore described heterogeneous tape having a high modulus basal tract and a relatively lower modulus marginal tract may be constructed or fabricated, when desired, so as to be integrally composed of a single high modulus basal and two relatively lower modulus, marginal tracts. In such case (not shown), the constituent plies of laminated structural articles or shapes would consist of a first strip of heterogeneous tape comprising a basal tract and two integral marginal tracts, then an adjacent high modulus strip made of the basal or prime material only, then another heterogeneous tape, etc., the net result being a ply composed of alternate tracts or strips of high modulus and low modulus material to form a laminate having substantially identical fracture arresting capabilities as those previously described hereinabove as the preferred form of the invention.

It will also be obvious to those skilled in the art that a compaginated sheet material may be fabricated by so disposing constituent materials having differing physical characteristics that alternate high modulus and low modulus rows or tracts, one adjacent to the other, are resultant therefrom and that laminated composite shapes having fracture arresting capabilities may be constructed therefrom.

As thus described, the structural article of the present invention is characterized as a laminated composite article composed of a heterogeneous material whose constituent elements possess an inherent capability for effecting fracture retardation and arrestment where the functional character of the article satisfies both of the following mathematical expressions:

$$E_2 < E_1 \tag{12}$$

$$\left(\frac{K_{a_1}}{K_{a_2}}\right)^2 \left(\frac{E_2}{E_1}\right)^2 \leq \frac{1+a_1}{\frac{w_1}{2}+a_2} \tag{13}$$

Since for all practical design configurations, the initial value of the half crack length will lie between 0.0 and $W_1/2$, the values of $a_1$ and $a_2$ are substantially of the same magnitude, consequently equation (13) can be rewritten in general form as:

$$\left(\frac{K_{a_1}}{K_{a_2}}\right)^2 \left(\frac{E_2}{E_1}\right)^2 < 1. \tag{14}$$

to thus indicate the range of values of $K_{a_1}$, $K_{a_2}$, $E_2$ and $E_1$ for which some degree of arrestment capacity is provided.

It will be appreciated that the invention herein encompasses a heterogeneous tape-like strip material, sheet and laminates thereof comprising, in combination, a basal tract and horizontally coplanar therewith at least one adjacent marginal fracture barrier tract with the basal tract possessing a higher value of Young's Modulus in the direction parallel to the strip, or to the tracts, than that of the marginal barrier tract in the same direction. It will also be appreciated that the heterogeneous tape-like strip material, sheet or laminate, as to said basal tract, comprises a fiber reinforcing material embodied within a resinous polymer matrix material, said reinforcing material serving as the load carrying medium and said matrix material serving as a carrier, protector, and load splicing medium around the reinforcing material. Further, the invention encompasses reinforcing material in said basal tract that has a value of Young's Modulus in the direction parallel to the strip, or tract, greater than nine million pounds per square inch.

By reference to the foregoing and the drawings, especially FIG. 6, it will be understood that a multiply heterogeneous composite structural laminate of this invention having high crack propagation arrestment characteristics, comprises: at least one fracture barrier containing primary ply having a plurality of generally parallel high modulus fibers embedded in a polymer matrix and formed from a plurality of substantially flat, strip-like basal tracts and fracture barrier tracts in horizontally coplanar edge-to-edge arrangement therewith; said basal tracts possessing a higher value of modulus of elasticity in the direction parallel thereto than that of the marginally adjacent barrier tracts in the same direction; and at least one load distributing secondary ply of generally parallel high modulus reinforcing fibers embedded in a resinous polymer matrix and united in face-to-face relationship to said fracture barrier containing ply; and said load distributing ply having load-transmitting portions whose modulus of elasticity as measured in the direction of the basal tracts of said first mentioned ply is less than said basal tracts and structurally connect across basal tracts of an adjacent ply for transmitting of loadings therebetween.

In practicing the invention a method for making a tapelike strip material consists of unidirectionally collocating tectonic filaments in a substantially planar array within a resin matrix to form a basal tract having a high value of Young's Modulus and high tensile strength in a direction parallel to the filaments; forming at least one barrier tract functionally directly related to the basal tract and having a Young's Modulus of low value relative to that of the basal tract. Forming a composite sheet-like article resistant to propagation of fast rupture fractures therein comprises: positioning a first tape-like heterogeneous strip material which includes unidirectionally oriented filamentary material forming a high tensile strength load-carrying basal strip having a first Young's Modulus value; and positioning on at least one side parallel to the orientation of the filamentary material and adjacent thereto a second strip having a Young's Modulus of lower value than that of the basal strip and forming a barrier to crack propagation in the basal strip; and progressively continuining placement of substantially like first and second strips to form the desired composite article; and joining the positioned first and second tape-like strips and subsequently progressively placed like strips to form a finitely dimensioned composite article. Making a laminated structural article having as an inherent characteristic crack propagation arrestment capability, comprises: positioning plural tape-like load-carrying basal tracts having a first predetermined Young's Modulus and high tensile strength in a predetermined pattern substantially conforming to design-dictated structural requirements; alternately interposing adjacent to and in juxtaposition with the thus positioned load-carrying basal tracts a plurality of barrier tracts having a second Young's Modulus of lesser value relative to the basal tracts; and joining each of the basal and barrier tracts to adjacent tracts to form a heterogeneous bi-modulus single ply. Then a laminate may be made by forming plural substantially similar plies each comprising plural alternately disposed basal-barrier tract plies in intimate cohesive relationship one to another; off-setting angularly from the preceding ply in the high-tensile strength direction each succeeding ply a predetermined amount; and positioning in vertical alignment all barrier tracts in all plies having the same angular orientation.

We claim:

1. A heterogeneous tape-like composite strip having horizontally coplanar portions differing in modulus of elasticity for forming structural laminates having high crack propagation arrestment characteristics comprising in combination:

a basal tract and at least one fracture barrier tract narrower than said basal tract in coplanar edge-to-edge arrangement therewith to form a heterogeneous tape-like, composite strip, the basal tract adapted to carry the major portion of a load applied to said strip and the barrier tract forming a marginal area to said basal tract of said strip and acting to arrest propagation of a crack developing in said basal tract and extending to said barrier tract, each of said tracts being a substantially flat strip containing a plurality of generally parallel reinforcement fibers embedded in a fracture tough resinous polymer matrix, the tracts being disposed in a common horizontal plane and integrally united along their adjoining edges, the modulus of elasticity of the basal tract fibers being greater than nine million pounds per square inch, and said basal tract possessing a higher value of modulus of elasticity in the direction parallel thereto than that of the marginal barrier tract in the same direction.

2. The composite strip of claim 1 in which the fibers in said basal tract are directionally oriented generally in the direction of said tract and the fibers in said barrier tract are directionally oriented generally angularly with respect to the fiber of said basal tract.

3. The composite strip of claim 2 in which the orientation of the fibers in said barrier tract is about 45° with respect to said basal tract fibers.

4. The composite strip of claim 1 in which the fracture toughness and modulus of elasticity of said basal tract and said fracture barrier tract are in accordance with the expression:

$$\left(\frac{K_{Q_1}}{K_{Q_2}}\right)^2 \left(\frac{E_2}{E_1}\right)^2 < 1$$

where $K_{Q_1}$ and $K_{Q_2}$ represent the fracture toughness of the basal and fracture barrier tracts respectively, and $E_1$ and $E_2$ represent the modulus of elasticity of the basal and fracture barrier tracts respectively, all quantities measured in a direction parallel to said composite strip.

5. The composite strip of claim 1 in which the reinforcement fibers are selected from the materials group consisting of boron, graphite, silicon-carbide and S-glass.

6. The composite strip of claim 1 in which the said resinous polymer matrix is a thermosetting plastic.

7. The composite strip of claim 1 in which said reinforcement fibers are provided in a woven material.

8. A heterogeneous sheet-like material having horizontally coplanar portions of differing modulus of elasticity for fabricating therefrom a composite structural laminate having high crack propagation arrestment characteristics comprising in combination:

a plurality of basal tracts and a plurality of fracture barrier tracts in horizontally coplanar edge-to-edge arrangement therewith forming a heterogeneous composite sheet-like material.

the basal tracts adapted to carry the major portion of a load applied to said sheet and the barrier tracts being narrower than said basal tracts and disposed marginally to said basal tracts and acting to arrest propagation of a crack developing in one of said basal tracts and extending to an adjacent barrier tract, each of said tracts being a substantially flat strip containing a plurality of generally parallel reinforcement fibers embedded in a fracture tough resinous polymer matrix, the basal and marginal barrier tracts being alternately disposed in a common horizontal plane and integrally united along their adjoining edges, the modulus of elasticity of the basal tract fibers being greater than nine million pounds per square inch, and said basal tracts possessing a higher value of modulus of elasticity in the direction parallel thereto than that of the marginal barrier tracts in the same direction.

9. The sheet-like material of claim 8 in which the fibers in said basal tracts are directionally oriented generally in the direction of said tract and the fibers in said barrier tract are directionally oriented generally angularly with respect to the fiber of said basal tract.

10. The sheet-like material of claim 9 in which the orientation of the fibers in said barrier tract is 45° with respect to said basal tract fibers.

11. The sheet-like material of claim 8 in which the fracture toughness and modulus of elasticity of said basal tracts and said fracture barrier tracts are in accordance with the expression:

$$\left(\frac{K_{Q_1}}{K_{Q_2}}\right)^2 \left(\frac{E_2}{E_1}\right)^2 < 1$$

where $K_{Q_1}$ and $K_{Q_2}$ represent the fracture toughness of the basal and fracture barrier tracts respectively, and $E_1$ and $E_2$ represent the modulus of elasticity of the basal and fracture barrier tracts respectively, all quantities measured in a direction parallel to said composite strip.

12. The heterogeneous sheet-like material of claim 8 in which the reinforcement fibers are selected from the materials group consisting of boron, graphite, silicon-carbide and S-glass.

13. The heterogeneous sheet-like material of claim 8 in which the said resinous polymer matrix is a thermosetting plastic.

14. The heterogeneous sheet-like material of claim 8 in which said reinforcement fibers are provided in a woven material.

15. A multiply heterogeneous composite structural laminate having high crack propagation arrestment characteristics formed from a plurality of plies one or more of which contains horizontally coplanar portions of differing modulus of elasticity, comprising:

at least one fracture barrier containing primary ply having a plurality of generally parallel high modulus fibers embedded in a polymer matrix and formed from a plurality of substantially flat, strip-like basal tracts and fracture barrier tracts in horizontally coplanar edge-to-edge arrangement therewith;

the basal tracts adapted to carry the major portion of a load applied to said laminate and the barrier tracts being narrower than the basal tracts and disposed marginally to said basal tracts and acting to arrest propagation of a crack developing in one of said basal tracts and extending to an adjacent barrier tract;

the basal and marginal barrier tracts being alternately disposed in their ply in a common horizontal plane and integrally united along their adjoining edges;

said basal tracts possessing a higher value of modulus of elasticity in the direction parallel thereto than that of the marginally adjacent barrier tracts in the same direction; and the modulus of elasticity of the basal tract fibers being greater than nine million pounds per square inch; and at least one load distributing secondary ply of generally parallel high modulus reinforcing fibers embedded in a resinous polymer matrix and united in face-to-face relationship to said fracture barrier containing ply, and said load distributing secondary ply having load-transmitting portions whose modulus of elasticity as measured in the direction of the basal tracts of said first mentioned ply is less than said basal tracts and structurally connect across basal tracts of an adjacent ply for transmitting of loadings therebetween.

16. The structural laminate of claim 15 in which the fibers in each said basal tract are directionally oriented generally in the direction of such basal tract and the fibers in said barrier tract are directionally oriented generally angularly with respect to the fiber of said basal tract.

17. The structural laminate of claim 16 in which the orientation of the fibers of the barrier tracts is about 45° with respect to said basal tract fibers.

18. The multiply structural laminate of claim 15 in which there are a plurality of said primary plies for carrying the major or primary portion of a tensile load applied thereto and in which the barrier tracts of each primary load-bearing ply extend in the same direction and are positioned in vertical alignment with the barrier tracts of the other primary load-bearing plies of the laminate.

19. The structural laminate of claim 15 in which the fibers in said load transmitting portions of said secondary ply are angularly oriented with respect to the fibers of the basal tracts of said primary ply.

20. The structural laminate of claim 19 in which the load transmitting portions of said secondary ply are in alternate coplanar arrangement with crack propagation barrier strips integrally joined thereto, the fibers of the barrier strips being angled with respect to the fibers of said load transmitting portions.

21. The structural laminate of claim 15 in which the fracture toughness and modulus of elasticity of said basal tract and said fracture barrier tract are in accordance with the expression:

$$\left(\frac{K_{Q_1}}{K_{Q_2}}\right)^2 \quad \left(\frac{E_2}{E_1}\right)^2 < 1$$

where $K_{Q_1}$ and $K_{Q_2}$ respectively represent the fracture toughness of the basal and fracture barrier tracts, and $E_1$ and $E_2$ respectively represent the modulus of elasticity of the basal and fracture barrier tracts, all quantities measured in a direction parallel to said basal tracts.

22. The laminate of claim 15 in which the reinforcing fibers are selected from the materials group consisting of boron, graphite, silicon-carbide and S-glass.

23. The structural laminate of claim 15 in which the said resinous polymer matrix is a thermosetting plastic.

24. The structural laminate of claim 15 in which said reinforcing fibers are provided in a woven material.

* * * * *